United States Patent [19]

Lee

[11] 4,011,197

[45] Mar. 8, 1977

[54] METHOD OF CURING ORGANOSILOXANE COMPOSITIONS USING MICROWAVES

[75] Inventor: Chi-Long Lee, Midland, Mich.

[73] Assignee: Dow Corning Corporation, Midland, Mich.

[22] Filed: Sept. 18, 1975

[21] Appl. No.: 614,466

[52] U.S. Cl. .......................... 260/46.5 R; 260/18 S; 260/31.8 S; 260/37 SB; 260/46.5 E; 260/46.5 G; 260/46.5 UA; 260/46.5 Y; 264/26

[51] Int. Cl.$^2$ ....................................... C08G 77/04

[58] Field of Search .................. 264/26; 260/46.5 R, 260/46.5 UA, 46.5 G, 46.5 E, 46.5 5 Y, 18 S

[56] References Cited

UNITED STATES PATENTS

| | | | |
|---|---|---|---|
| 3,183,205 | 5/1965 | Bailey et al. ........................... | 260/37 |
| 3,445,420 | 5/1969 | Kookootsedes et al. ... | 260/46.5 UA |
| 3,666,830 | 5/1972 | Alekna ........................... | 260/46.5 R |
| 3,737,488 | 6/1973 | Porter et al. ........................... | 264/26 |

*Primary Examiner*—Melvyn I. Marquis
*Attorney, Agent, or Firm*—Roger H. Borrousch

[57] ABSTRACT

Organosiloxane compositions which contain at least five weight percent of organic radicals selected from aryl radicals, chlorinated aliphatic hydrocarbon radicals, fluorinated aliphatic hydrocarbon radicals, hydrocarbon radicals having carbon-bonded mercapto groups, hydrocarbon radicals having carbinol groups and aliphatic hydrocarbon ether radicals and comprise an organosiloxane polymer and a heat accelerated curing mechanism can be cured into useful products such as elastomers and resins by exposing these compositions to a microwave source having frequencies of from 900 to 5,000 mega Hertz until the composition cures.

7 Claims, No Drawings

METHOD OF CURING ORGANOSILOXANE COMPOSITIONS USING MICROWAVES

BACKGROUND OF THE INVENTION

1. Field of the Invention

This invention relates to curing organosiloxanes with microwaves.

2. Description of the Prior Art

The use of dielectric heating is broadly known in the prior art and includes the various electromagnetic phenomena, such as electric currents, radio waves, infrared rays and light. There are two ranges of radiofrequencies, one termed "high-frequency" in the range of about 1 to 200 megacycles per second and another termed "microwave" in the range above 890 megacycles per second. The units "cycles per second" are now referred to as "Hertz" which will be used hereinafter.

Silicones have been described as transparent to microwaves and in certain ranges of radio frequencies are known to be either non-responsive or at best show a poor response, as described on page 7 of "Encyclopedia of Polymer Science and Technology, Plastics, Resins, Rubbers, Fibers" Volume 5, 1966, Interscience Publishers, a division of John Wiley and Sons, Inc., New York, pages 1 to 23 relating to dielectric heating.

SUMMARY OF THE INVENTION

It is an object of this invention to provide a method for curing organosiloxane compositions by using microwaves.

Organosiloxane composition can be cured to a three dimensional network by using microwaves of 900 to 5,000 mega Hertz by designing the organosiloxane composition to contain certain silicon-bonded organic radicals and a heat accelerated curing mechanism. The cured products are elastomers or resins depending upon the nature of the starting polymer in the organosiloxane composition and the nature of the heat accelerated curing mechanism.

DESCRIPTION OF THE INVENTION

This invention relates to a method of curing a siloxane composition comprising exposing an organosiloxane composition to a microwave source having frequencies of from 900 to 5,000 mega Hertz until the organosiloxane has cured to a three dimensional network, said organosiloxane composition comprising an organosiloxane polymer and a heat accelerated curing mechanism, the organosiloxane composition having at least five weight percent of the silicon-bonded organic radicals selected from the group consisting of aryl radicals, chlorinated aliphatic hydrocarbon radicals, fluorinated aliphatic hydrocarbon radicals, hydrocarbon radicals having at least one carbon-bonded mercapto group, hydrocarbon radicals having at least one carbinol group and aliphatic hydrocarbon ether radicals, wherein all the organic radicals are bonded to silicon atoms through silicon-carbon bonds and any atom other than carbon or hydrogen being separated from the silicon atom by at least 3 carbon atoms, any remaining silicon-bonded organic radicals bonded to the silicon atom through silicon-carbon bonds in the organosiloxane composition being aliphatic hydrocarbon radicals.

The organosiloxane compositions suitable for this invention comprise an organosiloxane polymer and a heat accelerated curing mechanism. The organosiloxane composition contains at least five weight percent silicon-bonded organic radicals selected from aryl radicals, such as phenyl, phenylene, xenyl, tolyl and xylyl; chlorinated aliphatic hydrocarbon radicals, such as gammachloropropyl, gamma-chlorobutyl,

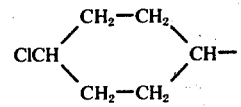

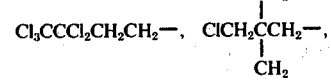

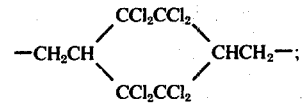

fluorinated aliphatic hydrocarbon radicals, such as 3,3,3-trifluoropropyl, beta(perfluorobutyl)ethyl, beta(-perfluorohexyl)ethyl,

and

hydrocarbon radicals having at least one carbon-bonded mercapto group, such as gamma-mercaptopropyl, delta-mercaptobutyl,

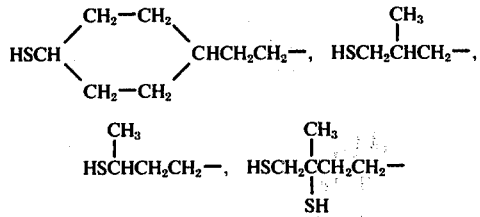

and

hydrocarbon radicals having at least one carbinol group, such as gamma-hydroxypropyl, delta-hydroxybutyl,

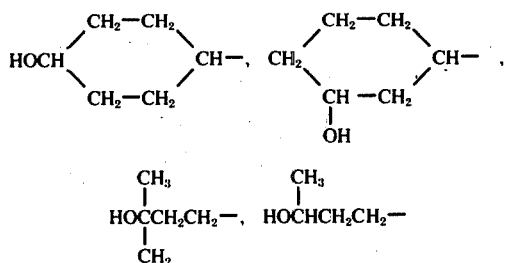

and

-continued

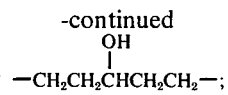

and aliphatic hydrocarbon ether radicals, such as

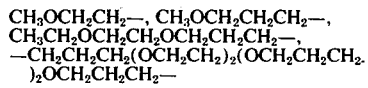

and

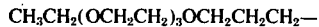

The organosiloxane composition can contain mixtures of two or more of the above organic radicals.

The above organic radicals are bonded to silicon atoms through a silicon-carbon bond and can be a radical of the organosiloxane polymer or of another organosiloxane ingredient in the organosiloxane composition, such as a radical of a fluid plasticizer or crosslinking agent. The total organosiloxane composition contains sufficient numbers of these organic radicals to provide at least 5 weight percent of the total organic radicals present in the organosiloxane composition. Preferably, these organic radicals are present in an amount sufficient to constitute at least 20 weight percent of the total organic radicals in the organosiloxane composition. Any remaining silicon-bonded organic radicals bonded to the silicon atoms through silicon-carbon bonds in the organosiloxane composition are aliphatic hydrocarbon radicals, such as methyl, ethyl, hexyl, octyl, isopropyl, tertiary butyl, vinyl, allyl and cyclohexyl. For practical purposes, any organic radical contains 18 or less carbon atoms.

The organosiloxane composition contains an organosiloxane polymer which is the predominate organosiloxane compound present in the organosiloxane composition. The organosiloxane polymer can have an average from 0.5 to 2.01 organic radicals per silicon atom and range from resins to fluids to gums. Organosiloxane polymers which have about two organic radicals per silicon are the polydiorganosiloxanes which are particularly useful as the base polymer for organosiloxane compositions which cure to elastomers. Organosiloxane polymers which have an average from 0.5 to 1.8 organic radicals per silicon atom are resinous in nature and cure to resin type products. Mixtures of these types of polymers are included herein.

Besides the organosiloxane polymer, the other essential component of the organosiloxane composition is a heat accelerated curing mechanism. There are many heat accelerated curing mechanisms which are known for curing organosiloxane compositions. Any of these heat accelerated curing mechanisms are suitable for the method of curing of this invention. Some heat curing accelerated curing mechanisms include organic peroxides, a combination of organohydrogensiloxane crosslinkers, a platinum catalyst and a platinum catalyst inhibitor, such as the acetylenic alcohols defined in U.S. Pat. No. 3,445,420 which is hereby incorporated by reference, and metal salts such as used with resinous organosiloxane polymers such as lead carbonate and lead octoate. Inasmuch as the specific nature of the heat accelerated curing mechanism is not narrowly critical to this invention, but only that it is a curing mechanism which is heat accelerated and which cures the organosiloxane composition to a three dimensional network. It is to be understood that heat accelerated also includes heat activated. Thus, a curing mechanism which is ineffective at room temperature but becomes effective at elevated temperatures is considered a heat accelerated curing mechanism. Elevated temperatures are, for practical purposes, above about 100° C. Curing mechanisms which are slow at room temperature but are more rapid at elevated temperatures are considered as heat accelerated.

The organosiloxane compositions can contain any of the other ingredients usually found in such compositions such as reinforcing, semi-reinforcing and extending fillers, fume silica, precipitated silica, quartz, calcium carbonate, talc, mica, asbestos, diatomaceous earth, titanium dioxide, carbon black and iron oxide; anti-oxidants, processing aids, anti-crepe agents, plasticizers, heat stability additives, flame retardant additives and the like.

The organosiloxane composition is formed into the proper shape or placed in the position where it is to be cured and then exposed to a microwave source which provides waves having frequencies of from 900 to 5,000 mega Hertz. The microwave source can be any of the commercial ovens which supply the defined frequencies. These ovens may be designed for batch curing or continuous curing. The power used to generate the microwaves can be varied, but is preferably that power, which provides to most efficient production of the frequency, be selected. The length of exposure for curing will vary considerably from composition to composition but usually 15 minutes or less is sufficient for most compositions. Many of the compositions permit curing times to be reduced from 60 to 90 percent compared to conventional heat curing.

This method has many advantages over conventional heating. The advantages are the ovens need be turned on only when curing is being done, does not require long heat up times, loss of heat is avoided, saves energy and is much faster. The organosiloxane compositions are designed for microwave curing without the use of certain additives as are known in the art, because many additives alter the properties of the cured products in undesirable ways such as decreasing the strength, lowering the electrical properties and decreasing the heat stability or weathering properties.

The organosiloxane compositions cure to elastomers or resins or gels depending on the organosiloxane composition. These products can be used, as such compositions are now used in the organosilicon art.

The following examples are presented for illustrative purposes and should not be construed as limiting the invention which is properly delineated in the claims.

EXAMPLE 1

A mixture was prepared by mixing 100 parts by weight of a trimethylsiloxy endblocked polydiorganosiloxane having a viscosity of about 800 centipoise at 25° C. and having 90.5 mol percent dimethylsiloxane units, 7.5 mol percent methylphenylsiloxane units, 1.1 mol percent methylvinylsiloxane units and the remainder being trimethylsiloxy units, 62.5 parts by weight of a trimethylsiloxy endblocked polydiorganosiloxane having a viscosity of about 50 centipoise at 25° C. and having 90 mol percent dimethylsiloxane units and 10 mol percent methylphenylsiloxane units, 74 parts by weight platinum per 1 million parts by weight mixture where the platinum was added in the form of a chloroplatinic acid catalyst, and 18.9 parts by weight of a dimethylhydrogensiloxy endblocked polydimethylsiloxane fluid having about nine dimethylsiloxane units per molecule. The mixture gelled in about two hours at room temperature, in about 30 minutes at 100° C. in a conventional electrically heated oven and in about 8 minutes at 135° C. in a conventional electrically heated oven. A sample of the mixture was placed in a commercial microwave oven at one kilowatt power supply and wave frequency of 2,450 mega Hertz for 15 minutes. The mixture gelled and provided an equivalent dielectric gel as cured by conventional oven heating at 100° or 135° C.

EXAMPLE 2

A mixture of 100 parts by weight of hydroxyl endblocked polydiorganosiloxane gum having a Williams plasticity of about 0.10 inch and having 93.3 mol percent methyl-3,3,3-trifluoropropylsiloxane units, 6 mol percent dimethylsiloxane units and 0.7 mol percent methylvinylsiloxane units, 42.7 parts by weight of reinforcing silica, 12.6 parts by weight of a hydroxyl endblocked polymethyl-3,3,3-trifluoropropylsiloxane fluid having about 6 weight percent hydroxyl radicals, 0.3 part by weight titanium dioxide, 0.5 part by weight 2,5-dimethyl-2,5-di(tertiary butylperoxy)hexane and 1.5 parts by weight ferric oxide was exposed to microwave frequency of 2,450 mega Hertz for 10 minutes by placing it in a commercial microwave oven at 1 kilowatt power. A cured elastomer was obtained which was equivalent to press vulcanizing the same mixture for 10 minutes at 171° C.

EXAMPLE 3

A silicone resin having 58 weight percent monophenylsiloxane units, 16.3 weight percent dimethylvinylsiloxane units, 14.8 weight percent dimethylhydrogensiloxane units and 10.9 weight percent diphenylsiloxane units was catalyzed with about 20 parts by weight platinum per 1 million parts by weight of resin where the platinum was in the form of a platinum complex of the formula $[(C_4H_9)_3PPtCl_2]_2$.

The catalyzed resin was exposed to microwaves of 2,450 mega Hertz for 5 minutes by placing in a commercial microwave oven set at one kilowatt power. The resin was cured and was equivalent to a resin cured for 1 hour at 100° C. in an electrically heated conventional oven.

EXAMPLE 4

A first mixture was prepared containing 100 parts by weight of a methylphenylvinylsiloxy endblocked polydimethylsiloxane having a viscosity of about 2,000 centipoise at 25° C., 25 parts by weight of ground quartz and 30 parts by weight of a peroxide mixture containing 35 weight percent 2,4-dichlorobenzoylperoxide with the remainder being dibutylphthalate and ground quartz. A second mixture was prepared containing 100 parts by weight of a trimethylsiloxy endblocked polydiorganosiloxane having an average per molecule of 242 dimethylsiloxane units and 13 units of the formula

and 25 parts by weight of ground quartz.

Equal weight ratios of the first and second mixtures were combined to make a curable mixture which cured to an elastomer with a dry surface when exposed to microwaves of 2,450 mega Hertz for 5 minutes in a commercial microwave oven set at 1 kilowatt power. A mixture of the polymer of the first mixture and the second mixture became sufficiently hot to initiate the peroxide cure in the absence of the ground quartz and peroxide mixture under the same curing conditions.

EXAMPLE 5

A first mixture was prepared containing 100 parts by weight of a dimethylvinylsiloxy endblocked polydiorganosiloxane having an equal molar ratio of dimethylsiloxane units and methyl-3,3,3-trifluoropropylsiloxane units and having a viscosity of 1959 centistokes at 25° C., 30 parts by weight of trimethylsilyl treated fume silica filler, 27 parts by weight platinum per one million parts by weight mixture added in the form of a chloroplatinic acid catalyst and 0.5 parts by weight of ferric oxide.

A second mixture was prepared containing 100 parts by weight of polydiorganosiloxane as defined above in the first mixture, 30 parts by weight of trimethylsilyl treated fume silica filler, 3.93 parts by weight of an equal weight mixture of $Si[OSi(CH_3)_2H]_4$ and dimethylhydrogensiloxy endblocked polymethyl-3,3,3-trifluoropropylsiloxane having three siloxane units per molecule and 0.406 parts by weight of a trimethylsiloxy endblocked polydiorganosiloxane having per molecule an average of two methylhydrogensiloxane units and one siloxane unit of the formula

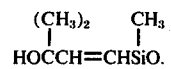

This polydiorganosiloxane was prepared by the method described in application Ser. No. 528,961, filed Dec. 2, 1974 now U.S. Pat. No. 3,933,880 by Floyd A. Bergstrom et al. and entitled "Method of Preparing A Platinum Catalyst Inhibitor" which application is hereby incorporated by reference to show the preparation of the polydiorganosiloxane.

Equal weights of the two mixtures were combined and the resulting mixture was exposed to the microwaves as defined in Example 4 for 3 minutes. A cured elastomer was obtained which had a uniform cure throughout the sample.

A mixture having equal weights of the above defined two mixtures were prepared except the ferric oxide was left out. An equivalent cured elastomer was obtained in 3 minutes exposure to the microwaves.

Exposing for 3 minutes to the microwaves, a mixture of the polydiorganosiloxane and the platinum catalyst generated heat sufficient to cause the mixture to smoke.

EXAMPLE 6

The following polymers were exposed to the microwaves as defined in Example 4 for 5 minutes and each became sufficiently hot to activate a peroxide catalyst or other heat activated catalysts.

A. A hydroxyl endblocked polydiorganosiloxane gum having 69.86 mol percent dimethylsiloxane units, 30 mol percent methylphenylsiloxane units and 0.14 mol percent methylvinylsiloxane units.

B. A high molecular weight block copolymer containing a block of polydimethylsiloxane and two blocks of polyoxyethylene with the siloxane block being present in an amount of 70 weight percent.

C. A block copolymer as defined in (B) above except the siloxane block was present in an amount of 15 weight percent and the molecular weight was 2,400.

D.
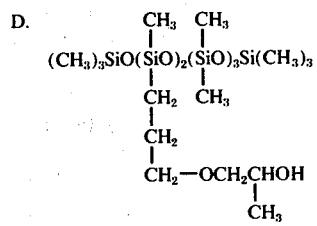

E. A copolymer having 60 mol percent dimethylsiloxane units and 40 mol percent gammachloropropylsiloxane units.

F. A copolymer having 80 mol percent dimethylsiloxane units and 20 mol percent gammachloropropylsiloxane units.

G. A polymer of gammachloropropylsiloxane units.

That which is claimed is:

1. A method of curing a siloxane composition comprising exposing an organosiloxane composition to a microwave source having frequencies of from 900 to 5,000 mega Hertz until the organosiloxane has cured to a three dimensional network, said organosiloxane composition comprising an organosiloxane polymer and a heat accelerated curing mechanism, the organosiloxane composition having at least five weight percent of the silicon-bonded organic radicals selected from the group consisting of aryl radicals, chlorinated aliphatic hydrocarbon radicals, fluorinated aliphatic hydrocarbon radicals, hydrocarbon radicals having at least one carbon-bonded mercapto group, hydrocarbon radicals having at least one carbinol group and aliphatic hydrocarbon ether radicals, wherein all the organic radicals are bonded to silicon atoms through silicon-carbon bonds and any atom other than carbon or hydrogen being separated from the silicon atom by at least three carbon atoms, any remaining silicon-bonded organic radicals bonded to the silicon atom through silicon-carbon bonds in the organosiloxane composition being aliphatic hydrocarbon radicals.

2. The method in accordance with claim 1 in which the heat accelerated curing mechanism is an organic peroxide.

3. The method in accordance with claim 1 in which the heat accelerated curing mechanism is a combination of an organohydrogensiloxane crosslinking agent, a platinum catalyst and a platinum catalyst inhibitor.

4. The method in accordance with claim 2 in which the organosiloxane polymer is a polydiorganosiloxane.

5. The method in accordance with claim 3 in which the organosiloxane polymer is polydiorganosiloxane.

6. The method in accordance with claim 1 in which the organosiloxane polymer is a resinous polymer having an average of from 0.5 to 1.8 organic radicals per silicon atom.

7. The method in accordance with claim 6 in which the heat accelerated curing mechanism is a lead catalyst.

* * * * *